United States Patent [19]

Gomikawa

[11] Patent Number: 5,576,768
[45] Date of Patent: Nov. 19, 1996

[54] CAPTION INFORMATION RECEIVING APPARATUS

[75] Inventor: Takao Gomikawa, Saitama-ken, Japan

[73] Assignee: Kabushiki Kaisha Toshiba, Kawasaki, Japan

[21] Appl. No.: 432,422

[22] Filed: Apr. 27, 1995

[30] Foreign Application Priority Data

Apr. 28, 1994 [JP] Japan .................................. 6-092532

[51] Int. Cl.$^6$ ............................................... H04N 7/087
[52] U.S. Cl. ........................................ 348/468; 348/564
[58] Field of Search ................................ 348/468, 564, 348/569, 589, 600, 473, 460; H04N 7/087

[56] References Cited

U.S. PATENT DOCUMENTS

| | | | |
|---|---|---|---|
| 4,894,289 | 1/1990 | Yee .......................................... | 348/468 |
| 5,111,296 | 5/1992 | Duffield et al. .......................... | 348/468 |
| 5,237,412 | 8/1993 | Nakajima ................................ | 348/468 |
| 5,262,860 | 11/1993 | Fitzpatrick ............................... | 348/468 |
| 5,375,160 | 12/1994 | Gaidon .................................... | 348/468 |
| 5,430,552 | 7/1995 | O'Callaghan ............................ | 348/468 |

*Primary Examiner*—Victor R. Kostak
*Attorney, Agent, or Firm*—Cushman, Darby & Cushman

[57] ABSTRACT

A caption information receiving apparatus for extracting a caption signal from an input video signal, decoding the digital signal contained in the caption signal and displaying the decoded data on a display screen. A keyboard equipped with keys selects a caption mode and caption information. A caption data memory stores the digital signals. A caption data extractor extracts a digital signal contained in the caption signals. A decoding controller stores the digital signals in the caption data memory and decodes the digital signal read from the caption data memory when an instruction for replaying the caption information is provided. A display controller provides caption information based on the decoded data from the decoding controller and defines a caption display area for displaying the caption information in the caption display area of the display screen.

6 Claims, 6 Drawing Sheets

CAPTION INFORMATION RECEIVING APPARATUS

BACKGROUND OF THE INVENTION

1. Field of the Invention

The present invention relates to a caption information receiving apparatus for extracting and displaying character information from video signals containing multiplexed character information, such as caption information, etc. and more particularly, to a caption information receiving apparatus which makes it easy to replay caption information.

2. Description of the Related Art

There are a variety of systems available for multiplexing and transmitting character and graphic information during the vertical retrace line period of video signals, such as television signals. This type of system includes, for instance, the character information broadcasting system in Japan; the world standard teletext (WST); the extended version of the United Kingdom teletext system; the closed caption system of the U.S.A., etc.

For instance, in the case of the closed caption system in the U.S.A., a caption signal in the form of a digital signal, which is caption information, is carried on the 21st line of the video signal during the vertical retrace line period of video signals. On the receiving side, the digital signal is extracted from the caption signal through a slice process to decode the caption signals.

The caption signal in this case is comprised of a clock run-in (CRI) signal added to the head of the caption signal for synchronizing with a digital signal when it is decoded and a succeeding digital signal. The caption information obtained by decoding the digital signal is principally comprised of the character information to be displayed on a display screen in connection with a picture image.

The digital signal is decoded in this case in a caption information receiving apparatus. The caption information receiving apparatus receives a video signal with a caption signal in the form of a digital signal carried during the vertical retrace line period and extracts the caption signal from the video signal and decodes the caption information from the digital signal representing the caption signal.

On the other hand, when learning a language using the caption information, character information is displayed in synchronization with picture and sound so that it is possible to study the spelling of characters. Further, it is also possible to check words by characters if the user failed to listen. However, words and conversations actually spoken are continuous without pause, and therefore, in learning a language, it may become difficult for a beginner to follow what has been spoken. Therefore, to check a portion of conversation/important words overlooked or failed to be listened to, video signals are once recorded on a magnetic tape using a VCR (video cassette recorder), the magnetic tape is rewound after being recorded and then caption information is displayed again by reproducing information from the magnetic tape. Thus, this practice was inconvenient as there was no adaptability to recheck required information.

A conventional caption information receiving apparatus described above had such inconvenience in that it has no adaptability to recheck required information, as video signals must be recorded on a magnetic tape using VCR to check past speeches or conversations through its caption information as well as past characters or words, while the magnetic tape is rewound after recording and caption information must be replayed by reproducing the information stored on the magnetic tape.

SUMMARY OF THE INVENTION

It is, therefore, an object of the present invention to provide a caption information receiving apparatus which is capable of solving the problem described above and reducing a time elapsed in order to display caption information.

In order to achieve the above object, a caption information receiving apparatus of a first embodiment for extracting a caption signal from an input video signal, wherein the caption signals contain a digital signal carried during the vertical retrace line period, decoding the digital signal contained in the caption signal and displaying the decoded data on a display screen, comprises means for instructing a caption information replay operation, a caption data memory for storing digital signals, a caption data extractor for extracting a digital signal contained in a caption signals which is carried on the input video signal, a decoding controller provided for storing digital signals in the caption data memory for decoding the digital signal read from the caption data memory when an instruction for replaying the caption information is instructed by the instructing means, and a display controller provided for constituting caption information based on the decoded data from the decoding controller, and for defining a caption display area for displaying the caption information on the display screen and for displaying of the constituted caption information in the caption display area.

In a second embodiment, a caption information receiving apparatus for extracting a caption signal from an input video signal with the caption signal containing a digital signal carried during the vertical retrace line period, decoding the digital signal representing the caption signal and displaying the decoded digital signal as caption information on a display screen, comprises means for instructing a caption information replay operation. A caption data memory for storing digital signals, a caption data extractor for extracting a digital signal contained in a caption signal which is carried on the input video signal, a decoding controller provided for storing digital signals into the caption data memory, for reading the digital signal to be decoded from the caption data memory and for constituting decoded data when an instruction is input through the instructing means for replaying caption information, and a display controller for constituting caption information based on the decoded data from the decoding controller, defining the caption display area in the display screen, displaying the caption information in the caption display area, defining a caption display area with plural lines on the display screen and for displaying of new caption information in the caption display area by scrolling line by line the caption display area for successively updating the caption information with the current caption information by one line at a time when an instruction is input through the instructing means for replaying the caption information.

In a third embodiment, a caption information receiving apparatus for extracting a caption signal from an input video signal with the caption signal containing a digital signal carried during the vertical retrace line period, decoding the digital signal representing the caption signal and displaying the decoded data as caption information on the display screen, comprises recording/reproducing means for recording/reproducing the input video signal, means for instructing a replay operation of caption information, a caption data memory for storing digital signals, a caption data extractor for extracting a digital signal contained in a caption signal carried on the input video signal which has been reproduced by the recording/reproducing means, a decoding controller provided for storing a digital signal in the caption data memory, decoding the digital signal, constituting decoded data, stopping the recording/reproducing means when an instruction is input through the instructing means for replaying the caption information, reading the digital signal from the caption data memory, and for decoding the digital signal and constituting of decoded data, and a display controller provided for constituting caption information based on the decoded data from the decoding controller, defining the caption display area on the display screen and for displaying of the caption information in the caption display area.

According to the first embodiment described above, the decoding controller decodes the digital signals read from the caption data memory when a replay operation is instructed. The decoding controller also constitutes the caption information based on the decoded data and defines the caption display area on the display screen to display the caption information in the caption display area. According to this aspect of the apparatus, it is possible to reduce the time needed to replay the caption information.

According to the second embodiment described above, the decoding controller decodes digital signals read from the caption data memory and constitutes decoded data. The display controller also constitutes the caption information based on the decoded data, and defines the caption display area with multiple lines on the display screen to display multiple lines of the caption information in the caption display area by scrolling up the lines of the current caption information one line at every time when a replay operation is instructed.

According to this aspect of the present apparatus, it is possible to reduce the time needed to replay the caption information.

According to the third embodiment described above, the decoding controller stops the operations of the recording/reproducing means while decoding the digital signals read from the caption data memory, when a replay operation is instructed. The decoding controller also defines the caption display area on the display screen to display the caption information in the caption display area. According to this aspect of the apparatus, it is possible to reduce the time needed to replay the caption information.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 6.

Figure 1:
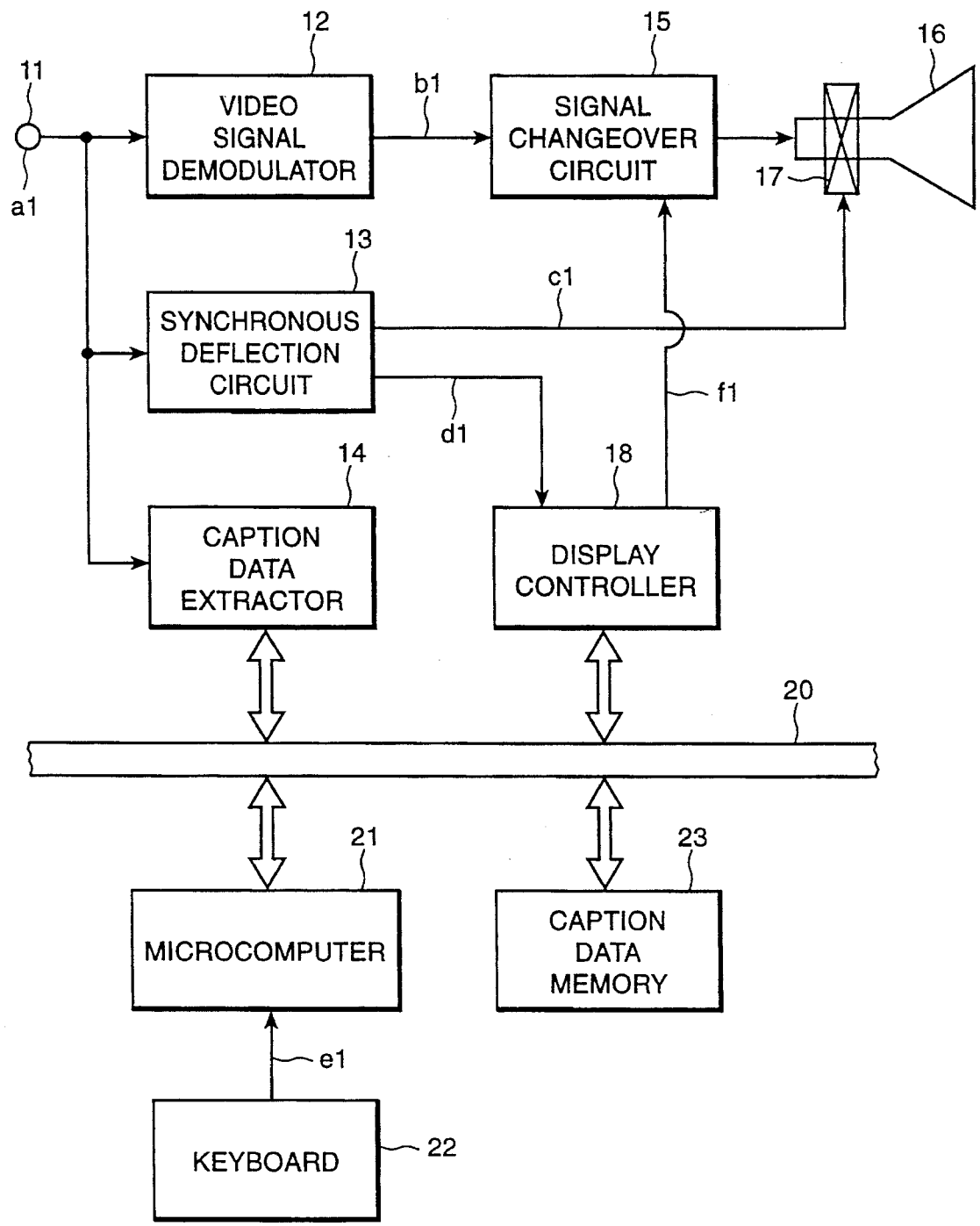
FIG. 1 is a block diagram showing a first embodiment of the caption information receiving apparatus according to the present invention.

Referring now to FIG. 1, a first embodiment of the caption information receiving apparatus according to the present invention, which is adapted to a television receiver, will be described in detail.

In FIG. 1, reference numeral 11 represents an input terminal for receiving a video signal a1 selected by a tuner of a television receiver. The input terminal 11 then supplies the television video signal a1 to a video signal demodulator 12, a synchronous deflection circuit 13 and a caption data extractor 14.

The video signal demodulator 12 demodulates a video signal b1 to be displayed from the television video signal a1. The video signal b1 is led to one terminal of a signal changeover circuit 15.

The synchronous deflection circuit 13 supplies a deflection drive signal c1 to a deflection yoke 17 of a television picture tube 16, which serves as a display screen, based on the supplied television video signal a1. The synchronous deflection circuit 13 also generates vertical and horizontal pulses d1, which are supplied to a display controller 18 as synchronous signals, for displaying caption information, which will be described later.

The caption data extractor 14 performs a slice process on the caption signal which is carried on the 21st line during the vertical retrace line period of the input video signal a1 for extracting a digital signal representing the caption signal. The extracted digital signal is supplied via a bus 20 to a microcomputer 21 which serves as a decoding controller.

A keyboard 22 equipped with keys such as a key for selecting a caption mode, a key for instructing a replay of the caption information, etc. provides a keyboard signal e1 instructed by a key operation to the microcomputer 21.

When a digital signal of a selected caption mode is supplied via the bus 20, a microcomputer 21 decodes caption data from the digital signal and stores the decoded data in a caption data memory 23 via the bus 20. In the decoding process, the microcomputer 21 carries out a parity check. The decoded data is supplied to the display controller 18 through the bus 20, when the replay operation is instructed through the keyboard 22.

The caption data memory 23 continuously stores the supplied digital signals in a so-called FIFO (first-in first-out) system. Thus, the stored data are successively updated for current data.

The microcomputer 21 disables the decoding process or the digital data when the caption display operation is not instructed on the keyboard 22.

When the keyboard signal e1 indicates the replay of caption information, the microcomputer 21 controls the read operation of the stored data from the caption data memory 23 through the bus 20. The digital signals are thus sequentially read out from the first-in stored one. The digital signal read out from the caption data memory 23 is supplied to the microcomputer 21 via the bus 20. The microcomputer 21 decodes the digital signal read out from the caption data memory 23 and supplies the decoded data to the display controller 18 via the bus 20.

The display controller 18 constitutes the caption information based on the decoded data supplied thereto, and defines a caption display area on the display screen in which the caption information is displayed. If the vertical and horizontal synchronizing pulses from the synchronous deflection circuit 13 indicate the caption display area, the display controller 18 leads the caption information to another input terminal of the signal changeover circuit 15 as a caption information display video signal f1 by synchronizing it with the vertical and horizontal synchronizing pulses d1.

The signal changeover circuit 15 serves to select either one of a displaying video signal b1 from the video signal demodulator 12 and the caption information displaying video signal f1 from the display controller 18. When the caption information displaying video signal f1 is not supplied from the display controller 18, the displaying video signal b1 is led to the television picture tube 16. If the caption information displaying video signal f1 is supplied from the display controller 18, the caption information displaying video signal f1 is led to the television picture tube 16.

The deflection york 17 executes the horizontal and vertical deflections of the television picture tube 16 by the deflection drive signal c1 from the synchronizing deflection circuit 13. Thus, the television picture tube 16 displays the displaying video signal supplied from the signal changeover circuit 15 on its display screen.

The operation of this embodiment will now be described.

First, a case where only picture images of a normal television broadcasting are displayed without displaying caption information will be described.

In this case, the microcomputer 21 is put in the standby state without performing the key operation of the keyboard 22. As a result, the display controller 18 prevents the output of the caption information displaying video signal f1 so that the signal changeover circuit 15 leads the video signal b1 to the television picture tube 16. Thus, picture images of an ordinary broadcast program are displayed on the display screen of the television picture tube 16.

Next, a case where the received caption information is directly displayed will be described.

In this case, a caption mode is input by the key operation on the keyboard 22. The microcomputer 21 waits until the digital signal supplied through the bus 20 becomes the data of the caption mode selected by the input signal e1 through the keyboard 22 and if the digital signal becomes the data of the caption mode selected through the keyboard 22, the microcomputer 21 stores the digital signal in the caption data memory 23 through the bus 20, decodes the data by executing the decoding process and supplies the decoded data to the display controller 18 through the bus 20. Thus, the display controller 18 constitutes caption information based on the supplied decoded data, and leads the caption information to another input terminal of the signal changeover circuit 15 as the caption information displaying video sign in synchronization with the display vertical and horizontal pulses d1. The signal changeover circuit 15 leads the caption information displaying video signal f1 to the television picture tube 16. Thus, the caption information is displayed in the caption display area of the screen of the television picture tube 16 so that an ordinary broadcasting program picture is displayed in the other area of the screen.

A case where the caption information stored in the caption data memory 23 is displayed will now be described.

In this case, the instruction for replaying caption information is input through the keyboard 22. The microcomputer 21 reads the digital data from the caption data memory 23 through the bus 20 in order on the first-in first-out basis. The microcomputer 21 decodes the digital signal read out from the caption data memory 23 and supplies the decoded data to the display controller 18 through the bus 20. Thus, the display controller 18 constitutes caption information based on the decoded data supplied thereto and leads the caption information to another input terminal of the signal changeover circuit 15 as the caption information displaying video signal f1 in synchronization with the displaying vertical and horizontal synchronizing pulses d1. The signal changeover circuit 15 leads the caption information displaying video signal f1 to the television picture tube 16. As a result, the previous caption information is displayed again in the caption display area defined on the display screen of the television picture tube 16 and pictures of a normal broadcast program are displayed in the other picture area.

Figure 2:
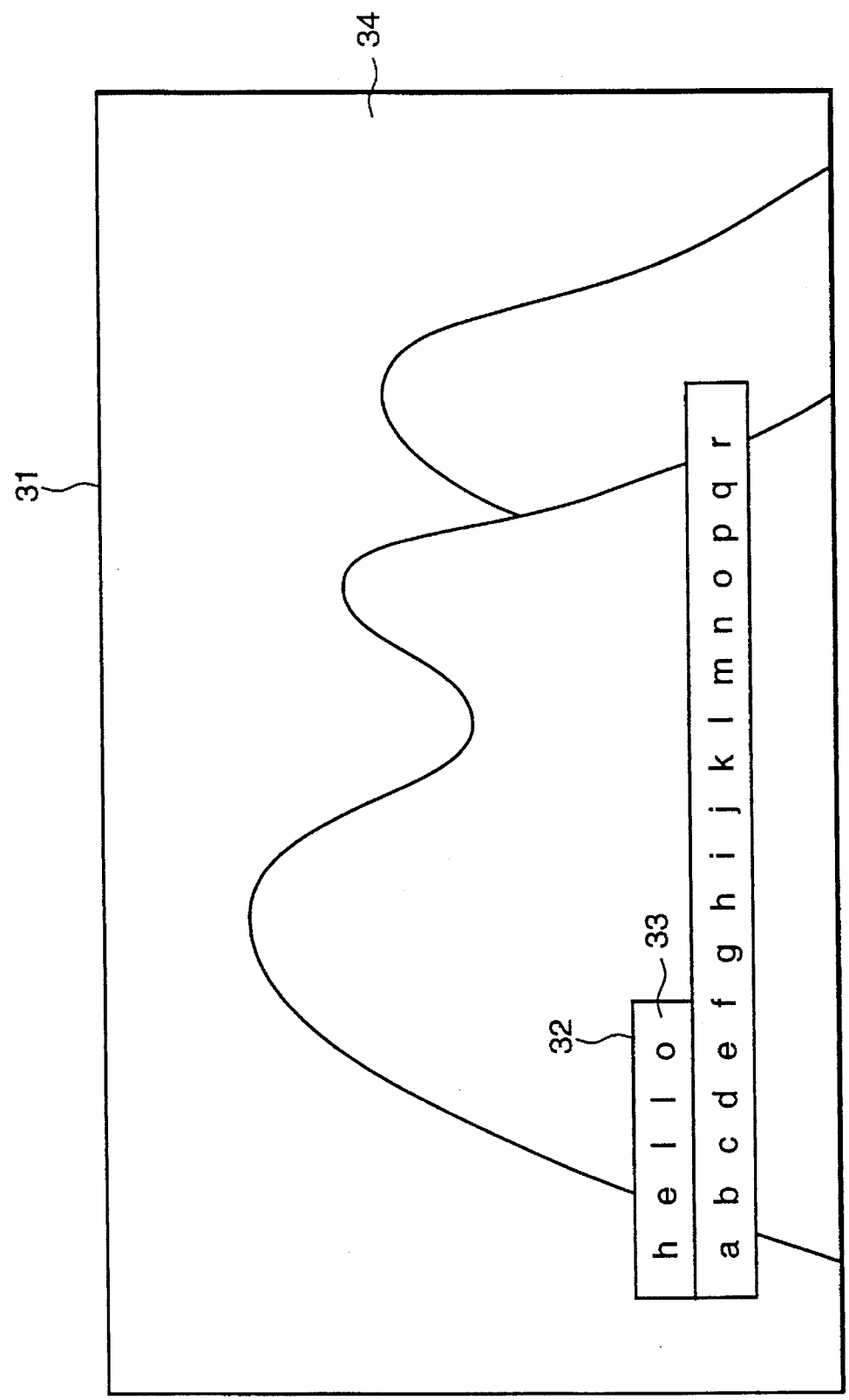
FIG. 2 is a diagram for explaining an example of the caption replay according to the first embodiment shown in FIG. 1.

FIG. 2 is an explanatory diagram showing an example of the replay of caption information.

In FIG. 2, reference numeral 31 represents the display screen of the television picture tube 16 shown in FIG. 1. Caption information 33 is replayed in a lower area 32 of the display screen 31 and pictures of an ordinary broadcast program are displayed in the other area 34 of the display screen 31. The caption information 33 is changed-over to next caption information at a specified interval of time.

According to the first embodiment of the caption information receiving apparatus described above, when an instruction is input through the keyboard 22 to replay caption information, it becomes possible to replay caption information based on the electrical control of the display controller 18, the signal changeover circuit 15, the microcomputer 21, the bus 20, the caption data memory 23, etc. without inconvenient and time-consuming use of a VCR record tape. It also becomes possible to reduce a time needed to replay caption information, thus improving the adaptability to the rapid rechecking and making the caption information receiving apparatus very convenient in learning a language using the caption information.

Figure 3:
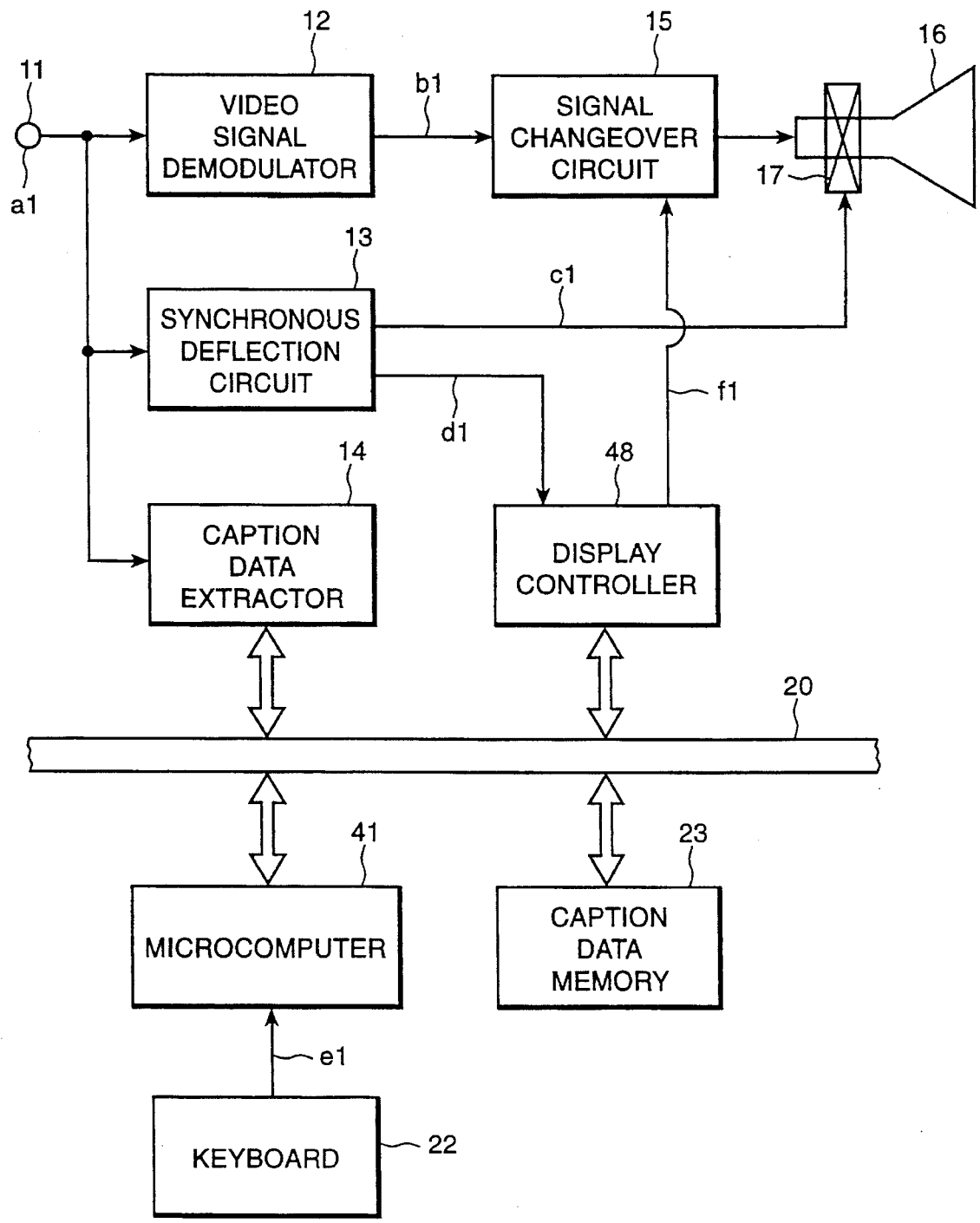
FIG. 3 is a block diagram showing a second embodiment of the caption information receiving apparatus according to the present invention.

Referring now to FIG. 3, a second embodiment of the present invention will be described in detail. In FIG. 3 the same reference numerals are assigned to components identical to those in the first embodiment shown in FIG. 1 and their explanations will be omitted.

When the instruction for replay of caption information (the caption replay) is made through the keyboard 22, the microcomputer 41, which also serves as a decoding controller, supplies a control signal to allocate a caption display area of prescribed plural lines to the display controller so through the bus 20, reads out a digital signal stored in the caption data memory 23, decodes the digital signal while performing the parity check and supplies the decoded data to the display controller 48 through the bus 20. When the instruction for displaying caption information is provided through the keyboard 22, the display controller 48 supplies the caption information displaying video signal f1 for displaying specified caption information in the secured display area of the television picture tube 16 to one of the input terminals of the signal changeover circuit 15 in synchronization with the displaying vertical and horizontal synchronizing pulses d1. If the display lines of the secured display area have been fully filled, the display controller 48 scrolls up the whole display one line at a time at a specified interval of time and supplies the caption information displaying video signal f1 for displaying new caption information to the other input terminal of the signal changeover circuit 15, displays the new caption information by updating the caption display area one line at a time from the lowest line of the display area.

The constructions of the microcomputer 41 and the display controller 48 other than those described above are identical to the microcomputer 21 and the display controller 18 shown in FIG. 1.

Figure 4:
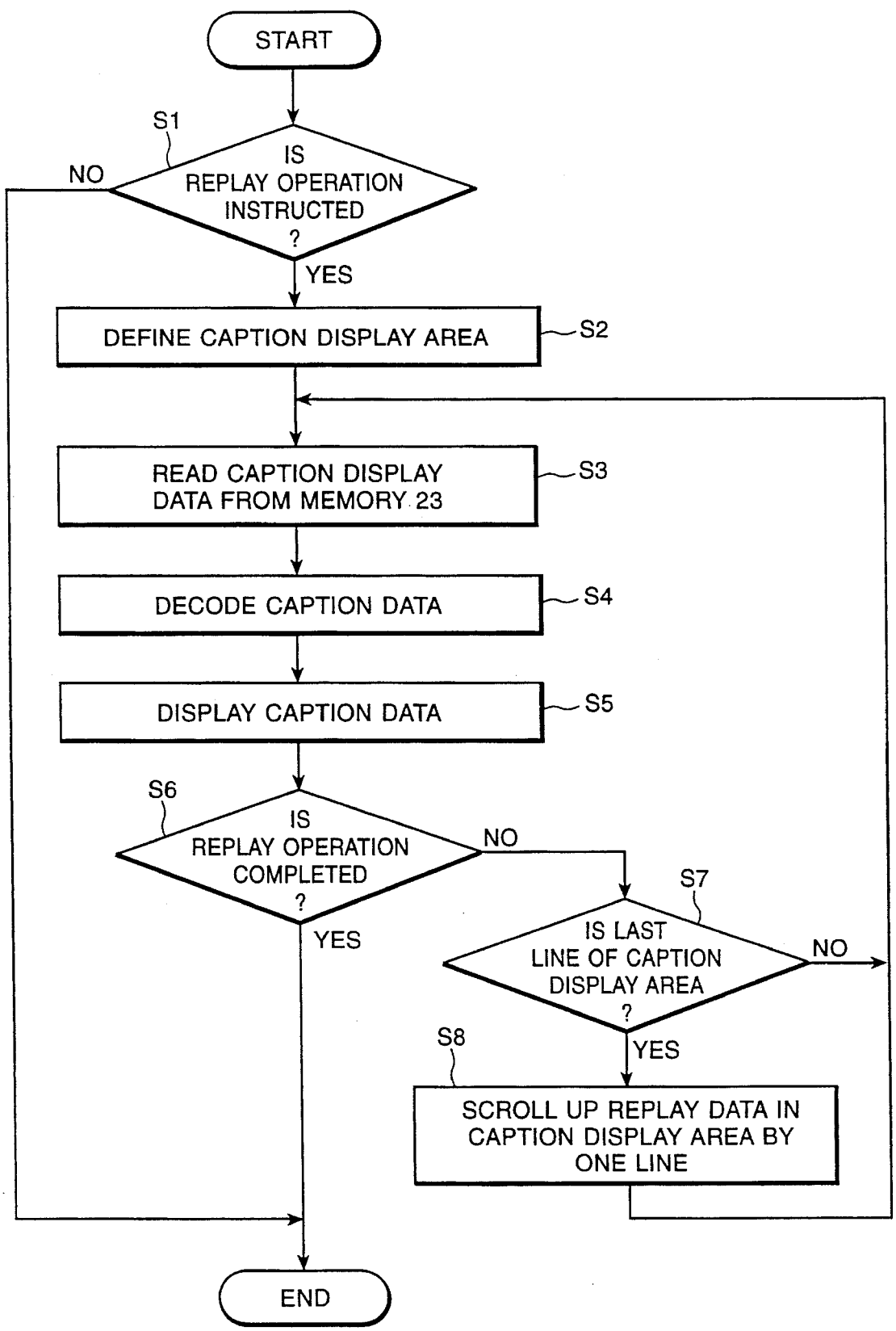
FIG. 4 is a flowchart showing the operation of the second embodiment shown in FIG. 3.

FIG. 4 is a flowchart showing the operations of the second embodiment as described above.

First, in Step S1 the microcomputer 41 judges whether there has been made a key operation for replaying the caption information through the keyboard 22. If there has been made the key operation, the judgment becomes "YES" and the operation proceeds to Step S2. If there has been no key operation, the judgment becomes "NO" and the process ends.

In Step S2, the microcomputer 41 supplies the control signal to the display controller 48 to allocate the caption display area with prescribed number of lines (7 lines in this case), initializes the caption display area for replaying the caption information and proceeds to the process in Step S3.

In Step S3, the microcomputer 41 reads the digital signal for the replay data stored in the caption data memory 23 and proceeds to Step S4. In Step S4, the microcomputer 41 decodes the digital signal for the replay data read in Step S3 while performing the parity check and proceeds to Step S5. In Step S5, the microcomputer 41 supplies the decoded caption data to the display controller 48. The display controller 48 assigns the decoded caption information on blank lines last in the display area which has been set in Step S2 and supplies the caption information displaying video signal f1 for displaying the caption information to the other input terminal of the signal changeover circuit 15.

Thereafter, in Step S6, the microcomputer 41 judges if the replay operation of the caption information has completed by checking if the reading operation of the replay data from the caption data memory 23 has completed. If the replay operation of the caption information has completed, the judgment becomes "YES" and the process ends. If the replay operation of the caption information has not completed, the judgment becomes "NO" and the process proceeds to Step S7.

In Step S7, the microcomputer 41 judges whether the line carrying the replayed caption information as set in Step S5 is the last line of the caption display area as set in Step S2. If it is not the last line, the judgment becomes "YES" and proceeds to the process in the Step S8. In Step S8, where the caption information have been replayed on all of the plural lines (7 lines in this case) of the caption display area as set in Step S2, the microcomputer 41 causes the caption display area to scroll up by one line after a specified display time to secure the display lines for displaying next replay data, and returns to Step S3.

Figure 5:
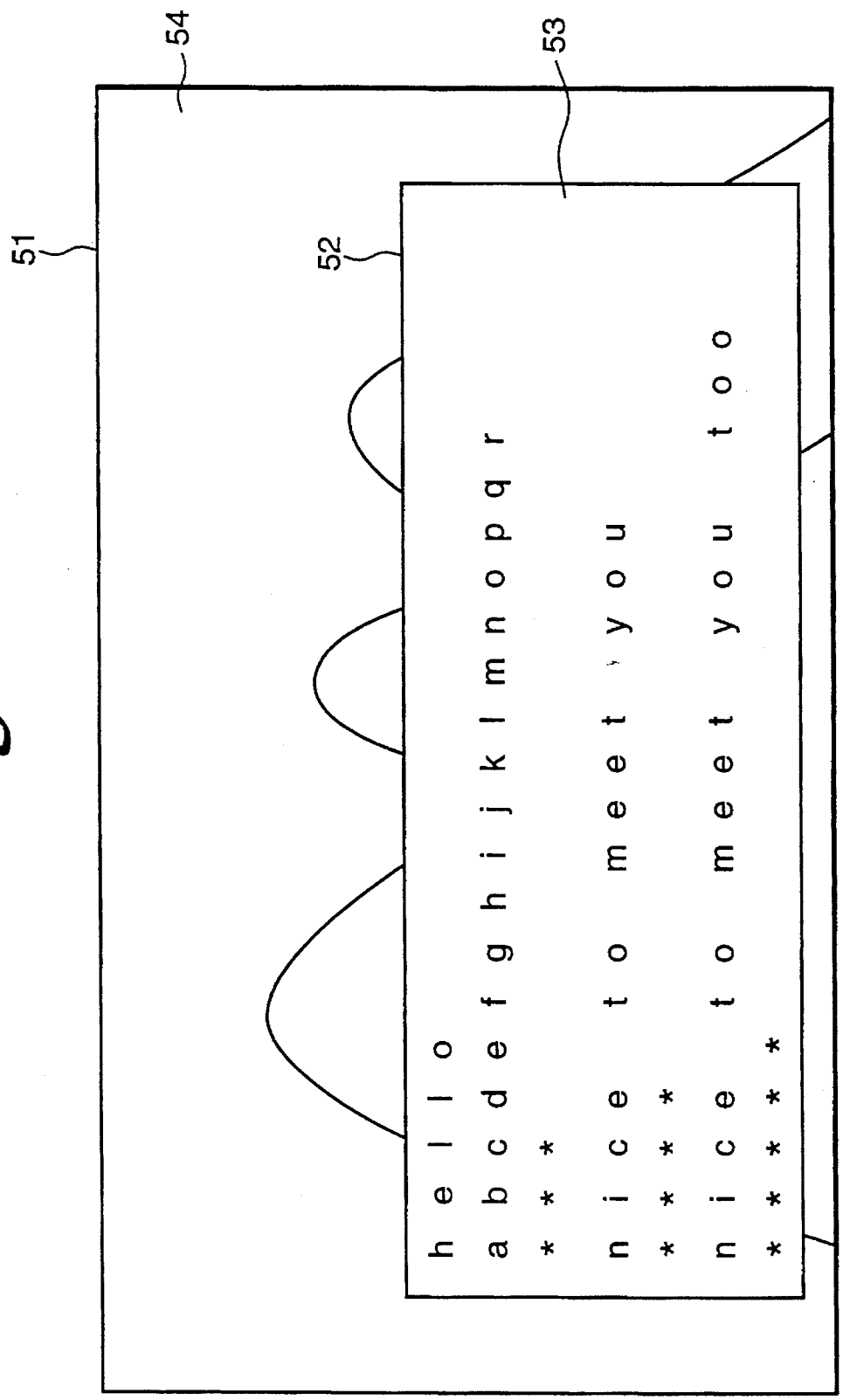
FIG. 5 is a diagram for explaining an example of the caption replay according to the second embodiment shown in FIG. 3.

FIG. 5 is an explanatory diagram showing an example of such the caption replay as described above.

Reference numeral 51 represents the display screen of the television picture tube 16 shown in FIG. 3. Caption information 53 is displayed in an area 52 comprising 7 lines at the lower portion of the display screen 51 and pictures of an ordinary broadcasting program are displayed in the other area 54 of the display screen 51. The caption information 53 is scrolled up at a specified interval of time and the caption information at the top line is erased and next caption information is displayed on the bottom line.

The second embodiment has the similar effect as in the first embodiment shown in FIG. 1, and as a relatively large amount of caption information is displayed at a time, and the current caption information is changed-over to next caption information one line at a time, the possibility of failing to read the caption text can be lowered.

Figure 6:
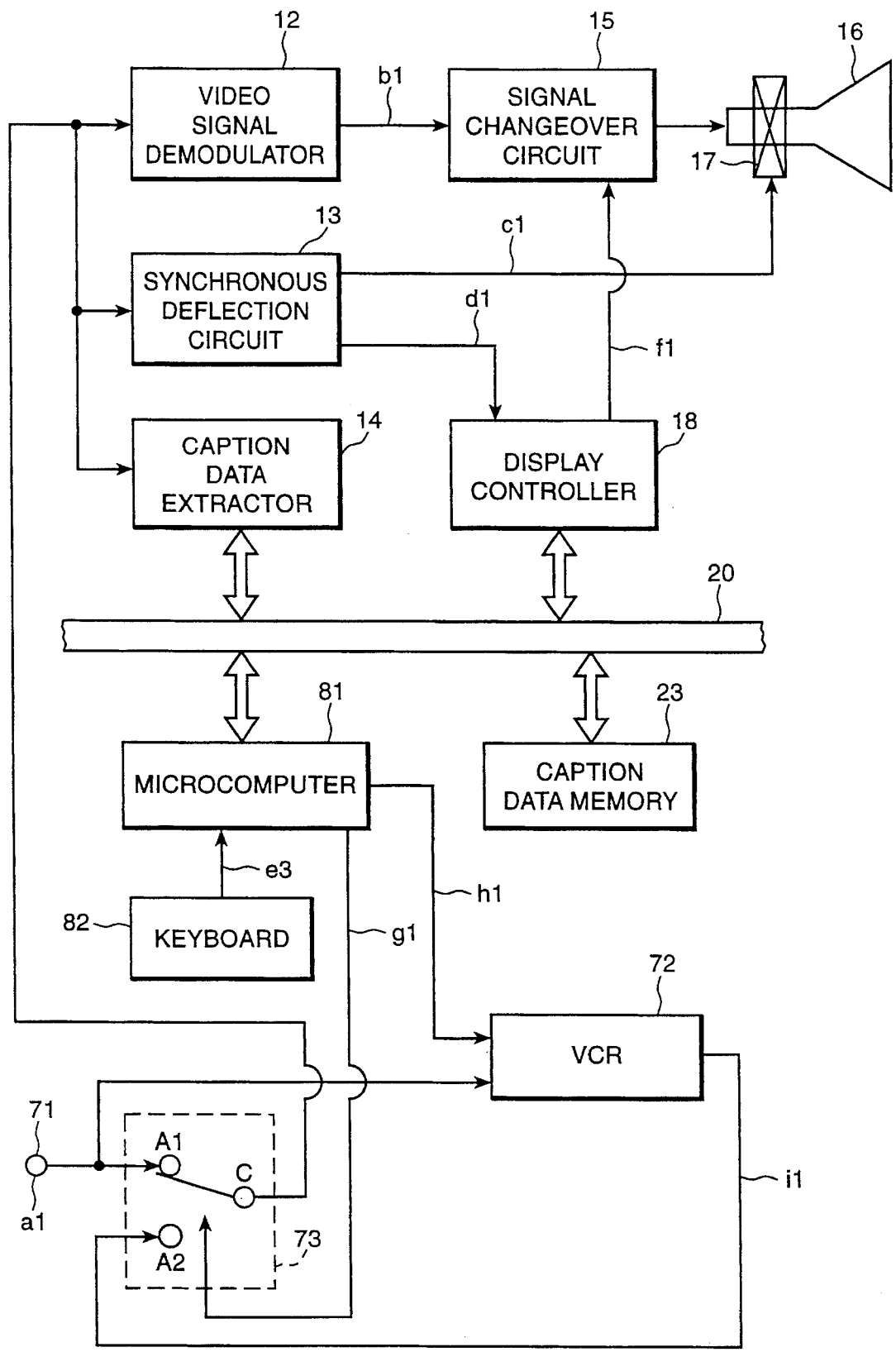
FIG. 6 is a block diagram showing a third embodiment of the caption information receiving apparatus according to the present invention.

Referring now to FIG. 6, a third embodiment of the present invention will be described in detail. In FIG. 6 components identical to those shown in FIG. 1 will be assigned with the same reference numerals and their explanations will be omitted.

In FIG. 6, reference numeral 71 represents an input terminal to which the television video signal a1 is input and the television video signal a1 input to the input terminal 71 is supplied to the video signal input terminal of a VCR (Video Cassette Recorder) 72 and an input terminal A1 of a changeover switch 73. The video signal output terminal of the VCR 72 is led to another input terminal A2 of the changeover switch 73. A common terminal C of the changeover switch 73 is connected to the input terminals of the video signal demodulator 12, the synchronous deflection circuit 13 and the caption data extractor 14.

The keyboard 82, i.e., key input means, is provided with keys for selecting a caption mode as well as for directing a replay operation of caption information. The keyboard 82 is further provided with VCR control keys such a as a record key "REC", a playback key "PLAY" and a VCR stop key "STOP". A keyboard signal e3 produced by operating any one of the keys is supplied to a microcomputer 81 serving as a decoding controller.

When the keyboard signal e3 represents that the playback key or the key for selecting the caption mode or the replay operation of the caption information from the playback signal is operated, the microcomputer 81 supplies a switch changeover signal g1 to the changeover switch 73 to select the input terminal A2. If it is indicated that any key other than those as mentioned is operated, the microcomputer 81 supplies the switch changeover signal g1 to the changeover switch 73 to select the other input terminal A1.

When the keyboard signal e3 represents that the playback key "PLAY" is operated, the microcomputer 81 supplies a control signal h1 to make the VCR 72 carry out the playback operation. If the keyboard signal e3 represents that the record key "REC" is operated, the microcomputer 81 supplies the control signal h1 to make the VCR 72 carry out the recording operation (i.e., the recording operation of the television video signal a1 on a VCR record tape). Further if the keyboard signal e3 represents that the VCR stop key "STOP" or the caption replay key is operated, the microcomputer 81 supplies the control signal h1 to make the VCR 72 stop its operation. In other cases, the microcomputer 81 executes the operations similar to those of the microcomputer 21 shown in FIG. 1.

When the switch changeover signal g1 associated with the input terminal A1 is produced, the changeover switch 73 connects the input terminal A1 to the common terminal C so as to lead the television video signal a1 from the input terminal 71 to the video signal demodulator 12, the synchronous deflection circuit 13 and the caption data extractor 14. If the switch changeover signal g1 associated with the input terminal A2 is produced, the changeover switch 73 connects the input terminal A2 to the common terminal C so as to lead the television video signal i1 reproduced by the VCR 72 to the video signal demodulator 12, the synchronous deflection circuit 13 and the caption data extractor 14.

In the case of displaying the caption information reproduced by the VCR 72, the playback key "PLAY" of the keyboard 82 is operated while operating the selection key of the caption mode type on the keyboard 22. Then the microcomputer 81 supplies the switch changeover signal g1 to the changeover switch 73 to select the input terminal A2 and leads the television video signal i1 reproduced by the VCR 72 to the video signal demodulator 12, the synchronous deflection circuit 13 and the caption data extractor 14. As a result, the caption information is displayed in the caption display area. If the caption replay key on the keyboard 22 is operated during the reproducing operation of the VCR, the microcomputer 81 controls to replay the caption information in the manner similar to the case as mentioned in reference to FIG. 2, but stops at this time the operation of the VCR 72.

According to the third embodiment, the same effect as in the first embodiment shown in FIG. 1 is obtained and when the caption replay key of the keyboard 82 is operated when the VCR 72 is in the reproducing operation, the reproduction of the VCR 72 can be stopped and therefore, there is no possibility to overlook a new caption display when checking the caption information being replayed.

Further, in the embodiments shown in FIGS. 1 through 6, a television picture tube is used as a display means, but other display means, for instance, a liquid crystal panel may be used. Further, in the embodiment shown in FIG. 6, a VCR is used as the recording/reproducing means, but other recording/reproducing means, for instance, a recording/reproducing apparatus using an optical magnetic recording disk may be usable.

As the present invention makes it possible to reduce the time needed to replay caption information, the adaptability of replaying the caption information can be improved. Thus, the present invention provides a very convenient way of learning a language using the caption information.

As described above, the present invention provides an extremely preferable caption information receiving apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A caption information receiving apparatus for extracting a caption signal from an input video signal, wherein the caption signal contains a digital signal carried during the vertical retrace line period of the video signal, decoding the digital signal contained in the caption signal and displaying the decoded data on a display screen, comprising:

key input means having a key for instructing display operations of the caption signal and its associated video signal simultaneously, and a key for instructing a replay operation of the caption signal;

a caption data memory for storing the digital signal;

a caption data extractor for extracting the digital signal contained in the caption signal which is carried on the input video signal;

a decoding controller for storing the digital signal in the caption data memory, and in response to the replay operation instruction, for reading the caption signals associated with an image displayed immediately preceding selection of the replay operation instruction; and a display controller provided for constituting caption information based on decoded data from the decoding controller, and for defining a caption display area for displaying caption information from the digital signal on the display screen in the caption display area.

2. A caption information receiving apparatus as claimed in claim 1, further comprising means for selecting a caption display mode.

3. A caption information receiving apparatus for extracting a caption signal from an input video signal, wherein the caption signal contains a digital signal carried during the vertical retrace line period of the video signal, decoding the digital signal representing the caption signal and displaying the decoded digital signal as caption information on a display screen, comprising:

key input means having a key for instructing simultaneously display the caption signal and its associated video signal simultaneously, and a key for instructing a replay operation of the caption signal;

a caption data memory for storing the digital signal;

a caption data extractor for extracting the digital signal contained in the caption signal which is carried on the input video signal;

a decoding controller for storing the digital signal in the caption data memory, and in response to a replay operation instruction, for reading the caption signals associated with an image displayed immediately preceding selection of the replay operation instruction; and a display controller provided for constituting caption information based on the decoded data from the decoding controller, defining a first caption display area in the display screen, displaying caption information in the first caption display area, defining a second caption display area having a plurality of lines on the display screen and for displaying new caption information in the second caption display area by scrolling line by line caption information provided in the second caption display area, thereby successively updating displayed caption information with the current caption information one line at a time if the instruction for replaying the caption information is input through the key input means.

4. A caption information receiving apparatus as claimed in claim 3, further comprising means for selecting a caption display mode.

5. A caption information receiving apparatus for extracting a caption signal from an input video signal, wherein the caption signal contains a digital signal carried during the vertical retrace line period of the video signal, decoding the digital signal representing the caption signal and displaying the decoded data as caption information on the display screen, comprising:

recording/reproducing means for recording/reproducing the input video signal;

key input means having a key for instructing display operations the caption signal and its associated video signal simultaneously and a key for instructing a replay operation of the caption signal;

a caption data memory for storing the digital signal;

a caption data extractor for extracting the digital signal contained in the caption signal which is carried on the input video signal;

a decoding controller for storing the digital signal in the caption data memory, and in response to a replay operation instruction, for reading the caption signals associated with an image displayed immediately preceding selection of the replay operation instruction and stopping the recording/reproducing means; and a display controller provided for constituting the caption information based on decoded data from the decoding controller, defining a caption display area on the display screen and for displaying the caption information in the caption display area.

6. A caption information receiving apparatus as claimed in claim 5, further comprising means for selecting a caption display mode.

* * * * *